United States Patent [19]

Kienzle et al.

[11] Patent Number: 5,199,300

[45] Date of Patent: Apr. 6, 1993

[54] DEVICE FOR CONTROLLING RESISTOR TEMPERATURE

[75] Inventors: Wolfgang Kienzle, Hemmingen; Rudolf Sauer, Benningen; Jürgen Gras, Bietigheim-Bissingen, all of Fed. Rep. of Germany

[73] Assignee: Robert Bosch GmbH, Stuttgart, Fed. Rep. of Germany

[21] Appl. No.: 671,906

[22] PCT Filed: Oct. 5, 1989

[86] PCT No.: PCT/DE89/00632

§ 371 Date: Mar. 20, 1991

§ 102(e) Date: Mar. 20, 1991

[87] PCT Pub. No.: WO90/04091

PCT Pub. Date: Apr. 19, 1990

[30] Foreign Application Priority Data

Oct. 15, 1988 [DE] Fed. Rep. of Germany ....... 3835235

[51] Int. Cl.[5] ............................................. F02M 65/00
[52] U.S. Cl. ................................. 73/118.2; 73/204.17
[58] Field of Search ............. 73/118.2, 204.15, 204.17, 73/204.27

[56] References Cited

U.S. PATENT DOCUMENTS

| | | |
|---|---|---|
| 4,125,093 | 11/1978 | Platzer, Jr. |
| 4,357,829 | 11/1982 | Kraus et al. ............... 73/204.27 |
| 4,373,382 | 2/1983 | Plapp et al. ............... 73/118.2 |
| 4,463,601 | 8/1984 | Rask ............... 73/118.2 |
| 4,537,172 | 8/1985 | Kanehara et al. |
| 4,756,185 | 7/1988 | Shimomura ............... 73/118.2 |
| 4,759,333 | 7/1988 | Shimomura et al. ............... 73/118.2 |
| 4,796,588 | 1/1989 | Shimomura et al. ............... 73/118.2 |
| 4,846,133 | 7/1989 | Shiraishi et al. ............... 73/118.2 |

OTHER PUBLICATIONS

Patent Abstracts of Japan, Band 12, Nr. 460 (P-795)(3307), Dec. 5, 1988, & JP, A, 63184017 (Mazda Motor Crop.) Jul. 29, 1988.
Patent Abstracts of Japan, Band 9, Nr. 286 (M-429)(2009), Nov. 13, 1985, & JP, A, 60125751 (Nissan Jidosha K.K.) Jul. 5, 1985.
Patent Abstracts of Japan, Band 8, Nr. 120 (M-300)(1557), Jun. 6, 1984, & JP, A, 5925043 (Nissan Jidosha K.K.) Feb. 8, 1984.

*Primary Examiner*—Jerry W. Myracle
*Attorney, Agent, or Firm*—Kenyon & Kenyon

[57] ABSTRACT

A device for controlling the temperature of a resistor used for measuring purposes is adversely affected in its measuring accuracy as the result of deposits on the resistor (8). To establish the degree of contamination and to initiate a free-burning operating, in the case of a device associated with an internal-combustion engine, the air volume (m), respectively the fuel quantity (k), is determined and compared to a specific limiting value ($m_{Max}$ or $k_{Max}$). When the limiting value is exceeded, a trigger signal is emitted to initiate the free-burning operation in order to burn free the resistor (8).

5 Claims, 1 Drawing Sheet

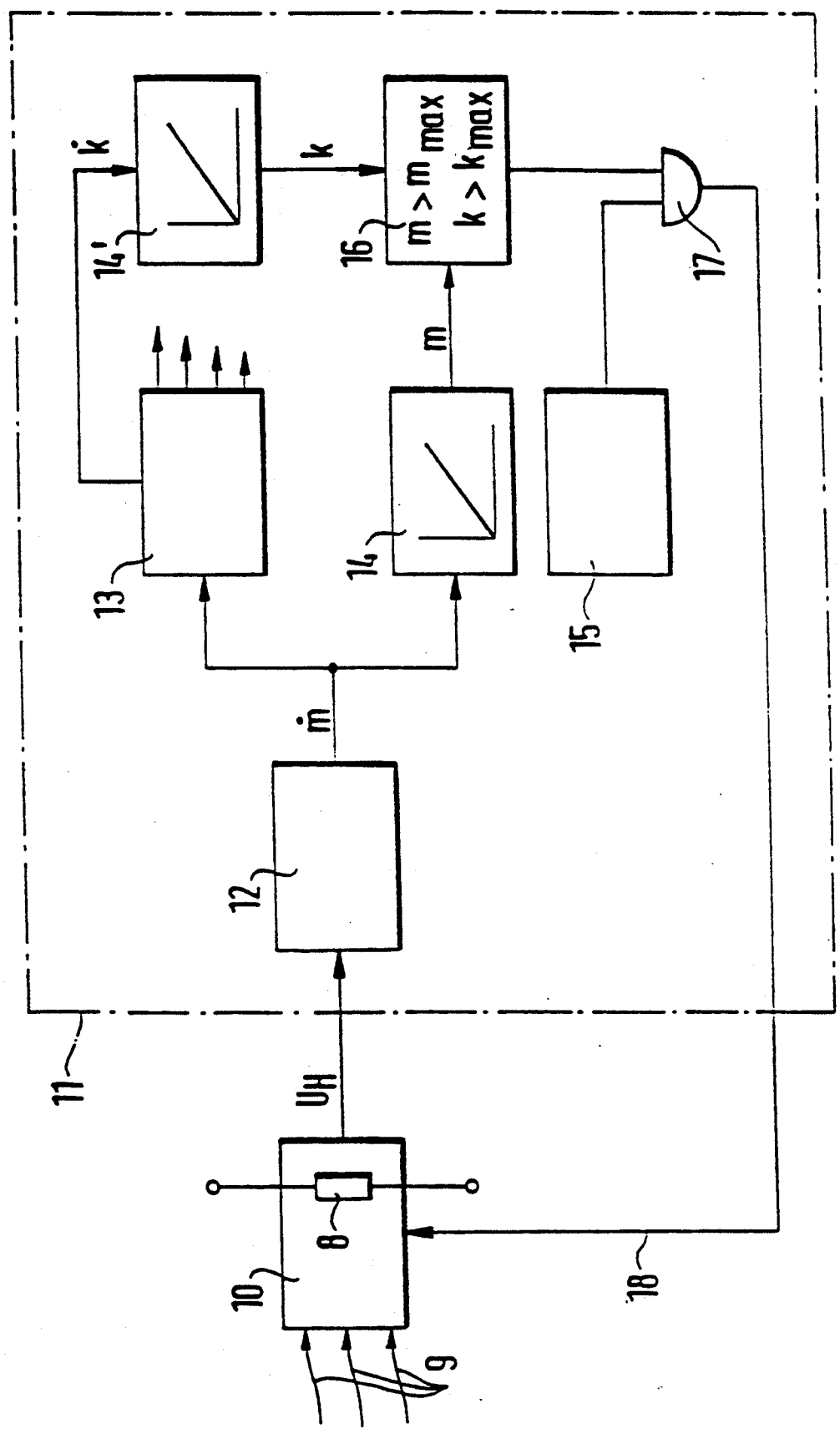

DEVICE FOR CONTROLLING RESISTOR TEMPERATURE

FIELD OF THE INVENTION

The present invention relates to systems and methods for controlling activation of a circuit element when predetermined conditions exist. More specifically, the present invention relates to systems and methods for controlling activation of a circuit element in a special cycle when predetermined conditions exist to prevent contamination of the circuit element.

BACKGROUND OF THE INVENTION

In the past, there have been hot-wire, air-mass flowmeters described for use in motor vehicles. U.S. Pat. No. 4,373,383 discloses such a system. According to U.S. Pat. No. 4,373,383, a resistor in the form of a hot-wire, air-mass flowmeter is used for measuring purposes in a motor vehicle. The hot wire is burned free of dirt particles in a free-burning operation which takes place after every time an internal-combustion engine is shut off. This is accomplished by a predetermined unbalancing of a bridge circuit which contains the resistor in a bridge arm.

In principle, this recurrent free-burning brings about good results. In particular, the drift in characteristics caused by the contamination of the resistor (which is generally made of platinum wire) is eliminated after each shut-off operation of the internal-combustion engine. However, along with every free-burning operation, parts of the wire material of the resistor are also vaporized, so that after a large number of free-burning operations, there is a disadvantageous distortion of characteristics.

In the past, there have been other systems that are not hot wire systems that have the ability to prevent contamination of an element used in a measuring device. U.S. Pat. No. 4,125,093 discloses a flowmeter which is based on a semiconductor and can be installed in automotive fuel injection systems to measure air mass and fuel quantity. To prevent the sensor from being contaminated, U.S. Pat. No. 4,125,093 proposes covering the semiconductor sensor with a passivation layer of silicon nitride and possibly with gold plating.

Prior systems also have used integration and comparing steps in the context of free-burning operations. Japanese Patent Nos. 60 125 751 and 63 184 018 disclose methods of integrating or summing up the suctioned air mass and then comparing the integration or cumulative value with a limiting value for the free-burning operation. When the integration or cumulative value exceeds the limiting value, a free-burning operation is initiated.

SUMMARY OF THE INVENTION

According to the present invention, the actual degree of contamination is considered for controlling the temperature of a resister used in a measuring device. This makes it possible to drastically reduce the number of free-burning operations that take place, compared to the number that would take place if the operating method initiated a free-burning operation every time the internal-combustion engine is shut off without considering the degree of contamination of the resistor. The system and method of the present invention considerably reduce any distortion of characteristics of the resistor resulting from material vaporization, while still producing an adequate cleaning effect. Thus, the resistor that is temperature controlled by the system and method of the present invention has a considerably longer operational life and, at the same time, high measuring accuracy for the measuring device in which it is incorporated.

In the case of the system of the present invention, it is found that available conventional control instruments and internal-combustion engine components may provide direct or indirect measurements of the amount of contamination of the resistor. Air-mass measurements associated with a flowmeter provide a direct measurement method for determining contamination of the resistor, while the measurement of the fuel flow rate of the internal combustion engine is an indirect method for measuring resistor contamination because the fuel flow rate is proportion to the air-mass. That is, it is useful for the purposes of the present invention also to be able to use indirect methods, such as fuel flow rate measurement, for determining the degree of contamination of the resistor and initiating a free-burning operation.

BRIEF DESCRIPTION OF THE DRAWING

The FIGURE shows a block diagram of the device according to the present invention.

DETAILED DESCRIPTION OF THE DRAWING

The present invention is a system and method for controlling activation of a circuit element. Referring to the FIGURE, a device for controlling the temperature of a resistor 8 used for measuring purposes is depicted. The resistor 8 is a component of a conventional bridge circuit, which is disposed in an air-mass flowmeter 10 of an internal-combustion engine. This air-mass flowmeter 10 is exposed to the air current 9 supplied to the internal-combustion engine. The air-mass flowmeter 10 is connected to a control instrument 11. By using a detecting means 12, this control instrument 11 determined, among other things, the air-mass rate of flow m from the voltage $U_H$, which is able to be tapped off at the bridge circuit arm containing the resistor 8. In doing this, it considers the characteristic of the air-mass flowmeter 10 and, with the help of a metering stage 13, it doses the fuel for the internal-combustion engine in accordance with the air-mass rate of flow.

The output terminal of the detecting means 12 is connected to the input terminal of first integrating means 14, whose output terminal is connected to a first input of a comparative stage 16. The output terminal of the comparative stage 16 leads to a first input of logical element 17, whose output terminal 18 is connected to a control input of the air-mass flowmeter 10. A second input terminal of the logical element 17 is connected to the output of a free-burning control circuit 15.

The mode of operation of controlling element 11 is as follows. In accordance with the voltage $U_H$ output from the bridge circuit, which includes the resistor 8, the detecting means 12 of the control instrument 11 generates an electrical signal corresponding to the air-mass rate of flow m in a conventional way, while considering the characteristic of the air-mass flowmeter 10. This electrical signal is fed to the metering stage 13 of the control instrument 11, and this metering stage 13 supplies a fuel quantity appropriate for the air-mass rate of flow m to the injection means of the internal-combustion engine, not depicted in detail in the FIGURE. At the same time, the electrical signal corresponding to the air-mass rate of flow m is fed to an input terminal of integrating means 14, which determine the air mass m that has passed through the air-mass flowmeter 10 by temporally integrating the air-mass rate of flow m. The output signal of the integrating means 14 corresponding to the air mass m is fed to the input terminal of a comparative stage 16, which checks if the air mass m in question exceeds a predetermined limiting value $m_{Max}$. In this case, the invention starts from the realization that the degree of contamination of the resistor 8 used for measuring purposes in the air-mass flowmeter 10 is proportional to the air mass m that has passed through the air-flow meter 10. Therefore, by measuring the air mass m, a criterion for deciding whether or not the resistor 8 has reached a degree of contamination harmful to the mode of operation of the air-mass flowmeter 10 can be derived in the comparative stage 16. The output terminal of the comparative stage 16 is connected to a first input terminal of a logical element 17. The second input terminal of the logical element 17 is then triggered by a free-burning control circuit 15 every time the ignition of the internal-combustion engine is switched off or the controller is turned off. The triggering of the air-mass flowmeter 10 via the control line 18 connected to the output terminal of the logical element 17 to subject the resistor 8 to a free-burning operation takes place, however, only when the comparative circuit 16 sends an appropriate control signal to the first input terminal of the logical element 17 when the predetermined limiting value $m_{Max}$ is exceeded.

In a further embodiment of the present invention, an output terminal of the metering stage 13, which emits an output signal corresponding to the fuel throughput rate k, is connected to the input terminal of two integrating means 14'. By means of temporal integration, these integrating means formulate the fuel quantity that the metering stage 13 supplies to the injection means of the internal-combustion engine. The output signal corresponding to the fuel quantity k is fed by the output terminal of the second integrating means 14' to a second input of the comparative stage 16 and is compared there to a predetermined limiting value $k_{Max}$. Here, the invention starts out with the realization that the fuel quantity k supplied by the metering stage 13 to the internal-combustion engine is at least indirectly a measure for the degree of contamination of the resistor 8 used for measuring purposes, since there is a legitimate correlation between the fuel quantity k supplied to the internal-combustion engine and the quantity of air m that has passed through the air-mass flowmeter 10. As stated, the comparative stage 16 triggers an input terminal of the logical element 17, when the fuel quantity k has exceeded the predetermined limiting value $m_{Max}$ and when, at the same time, the free-burning control circuit 15 emits an output signal, which signifies that the ignition has been switched off or that the controller has been turned off, to the second input terminal of the logical element 17.

We claim:

1. A method for automatically controlling the temperature of a current-carrying resistor that is incorporated in an air-mass flowmeter for an internal-combustion engine, the automatic control having a plurality of phases with one being a free-burning operation of the resistor, comprising the steps of:
   (a) determining a fuel throughput rate for the internal-combustion engine and generating a first signal representative of the fuel throughput rate;
   (b) integrating the first signal representative of the fuel throughput rate and generating a second signal representative of a fuel quantity;
   (c) comparing the second signal representative of the fuel quantity with a predetermined value and generating a third signal when the second signal exceeds the predetermined value; and
   (d) initiating a free-burning operation for the resistor when the third signal is generated.

2. The method according to claim 1, further comprising the following steps:
   detecting an air-mass rate of flow for the internal-combustion engine and generating a fourth signal representative of the detected air-mass rate of flow;
   integrating the fourth signal and generating a fifth signal based thereon;
   comparing the fifth signal to a predetermined threshold air-mass value and generating a sixth signal when the fifth signal exceeds the predetermined threshold air-mass value; and
   initiating the free-burning operation for the resistor based upon the third and sixth signals.

3. A method for automatically controlling the temperature of a current-carrying resistor that is incorporated in an air-mass flowmeter for an internal-combustion engine, the automatic control having a plurality of phases with one being a free-burning operation of the resistor, comprising the steps of:
   (a) determining a fuel throughput rate for the internal-combustion engine and generating a first signal representative of the fuel throughput rate;
   (b) integrating the first signal representative of the fuel throughput rate and generating a second signal representative of a fuel quantity;
   (c) comparing the second signal representative of the fuel quantity with a first predetermined value and generating a third signal when the second signal exceeds the first predetermined value; and
   (d) initiating a free-burning operation for the resistor when the third signal is generated and a timing signal has a second predetermined value.

4. A system for automatically controlling the temperature of a current-carrying resistor that is incorporated in an air-mass flowmeter for an internal-combustion engine, the automatic control having a plurality of phases with one being a free-burning operation of the resistor, comprising:
   (a) determining means for determining a fuel throughput rate of the internal-combustion engine and generating a first signal representative of the fuel throughput rate;
   (b) integrating means for integrating the first signal representative of the fuel throughput rate and generating a second signal representative of a fuel quantity;
   (c) comparing means for comparing the second signal representative of the fuel quantity with a predetermined value and generating a third signal when the second signal exceeds the predetermined value; and
   (d) driving means for generating a fourth signal for initiating a free-burning operation for the resistor when the third signal is generated.

5. A system for automatically controlling the temperature of a current-carrying resistor that is incorporated in an air-mass flowmeter for an internal-combustion engine, the automatic control having a plurality of phases with one being a free-burning operation of the resistor, comprising:
 (a) determining means for determining a fuel throughput rate of the internal-combustion engine and generating a first signal representative of the fuel throughput rate;
 (b) integrating means for integrating the first signal representative of the fuel throughput rate and generating a second signal representative of a fuel quantity;
 (c) comparing means for comparing the second signal representative of the fuel quantity with a predetermined value and generating a third signal when the second signal exceeds the predetermined value;
 (d) timing signal generating means for generating timing signals; and
 (e) gating means for generating a fourth signal for initiating a free-burning operation for the resistor when the third signal is generated and the timing signal generating means inputs a timing signal to the gating means.

* * * * *